(12) United States Patent
Islam

(10) Patent No.: US 9,790,051 B2
(45) Date of Patent: Oct. 17, 2017

(54) CONDUCTOR SPOOL AND OPTICAL FIBER / ELECTRICAL COMPOSITE CABLE WITH CONDUCTOR SPOOL ASSEMBLY

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 447 days.

(21) Appl. No.: 14/305,515

(22) Filed: Jun. 16, 2014

(65) Prior Publication Data
US 2014/0367163 A1 Dec. 18, 2014

Related U.S. Application Data

(60) Provisional application No. 61/836,565, filed on Jun. 18, 2013.

(51) Int. Cl.
*B65H 75/18* (2006.01)
*G02B 6/44* (2006.01)
(Continued)

(52) U.S. Cl.
CPC ............. *B65H 75/18* (2013.01); *B65H 75/08* (2013.01); *B65H 75/50* (2013.01); *G02B 6/4446* (2013.01);
(Continued)

(58) Field of Classification Search
CPC .. G02B 6/4447; G02B 6/4448; G02B 6/4446; G02B 6/4457; B65H 75/18; B65H 75/50; B65H 75/08; H01B 11/22
See application file for complete search history.

(56) References Cited

U.S. PATENT DOCUMENTS 2,364,262 A    5/1944   Mullaney
5,659,655 A *   8/1997   Pilatos ................ G02B 6/4446
                                               385/136
(Continued)

FOREIGN PATENT DOCUMENTS

DE      4438668 A1   5/1996
EP      0216073 B1   4/1987
(Continued)

OTHER PUBLICATIONS

Bernard Corneglio, International Search Report for PCT application PCT/US2014/042650, European Patent Office, Rijswijk, The Netherlands.

(Continued)

*Primary Examiner* — Hoa C Nguyen
*Assistant Examiner* — Amol Patel
(74) *Attorney, Agent, or Firm* — Myers Bigel, P.A.

(57) ABSTRACT

A conductor spool with a frame is provided with a plurality of first fingers, the first fingers and the frame defining a first spool surface. The frame is provided with an entry slot and an exit slot, a retainer gasket coupled to the frame proximate each of the entry slot and the exit slot. A cover is seated upon the frame, the cover enclosing the first spool surface. The conductor spool may be included in a wire harness and conductor spool assembly, the conductor spool seated upon a conductor lead furcated from a composite cable including at least one optical and at least one electrical conductor.

14 Claims, 11 Drawing Sheets

(51) Int. Cl.
*B65H 75/50* (2006.01)
*B65H 75/08* (2006.01)
*H01B 11/22* (2006.01)

(52) U.S. Cl.
CPC ......... *G02B 6/4447* (2013.01); *G02B 6/4448* (2013.01); *H01B 11/22* (2013.01); *G02B 6/4457* (2013.01); *Y10T 29/49826* (2015.01)

(56) References Cited

U.S. PATENT DOCUMENTS

| | | | |
|---|---|---|---|
| 5,947,765 | A | 9/1999 | Carlson, Jr. et al. |
| 6,535,684 | B1 | 3/2003 | Kondo et al. |
| 6,694,667 | B2 | 2/2004 | Davis |
| 7,330,627 | B2 | 2/2008 | Mullaney et al. |
| 7,346,253 | B2 | 3/2008 | Bloodworth et al. |
| 7,359,611 | B1* | 4/2008 | Kaplan ................ G02B 6/4457 385/134 |
| 7,397,997 | B2 | 7/2008 | Ferris et al. |
| 7,477,829 | B2 | 1/2009 | Kaplan |
| 2003/0091315 | A1* | 5/2003 | Allerellie ............ G02B 6/4447 385/135 |
| 2005/0145522 | A1* | 7/2005 | Bloodworth ......... G02B 6/4453 206/409 |
| 2007/0189694 | A1 | 8/2007 | Mullaney et al. |
| 2007/0274659 | A1* | 11/2007 | Kaplan ................ G02B 6/4441 385/134 |
| 2008/0170832 | A1* | 7/2008 | Mullaney ............. G02B 6/4471 385/135 |
| 2009/0058018 | A1* | 3/2009 | Mullaney ............. G02B 6/4447 277/625 |
| 2009/0290844 | A1 | 11/2009 | Mullaney et al. |

FOREIGN PATENT DOCUMENTS

| | | |
|---|---|---|
| WO | WO 0017693 | 3/2000 |
| WO | WO 2009029258 | 3/2009 |

OTHER PUBLICATIONS

European Office Action Corresponding to European Patent Application No. 14 737 120.7; dated Jan. 13, 2017; 8 Pages.

* cited by examiner

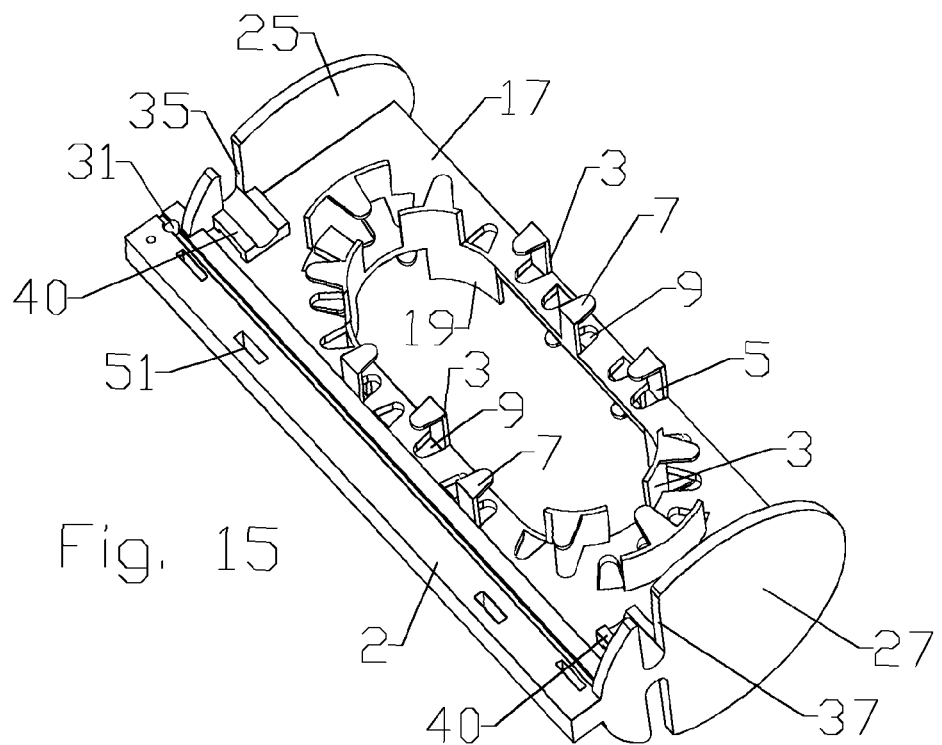
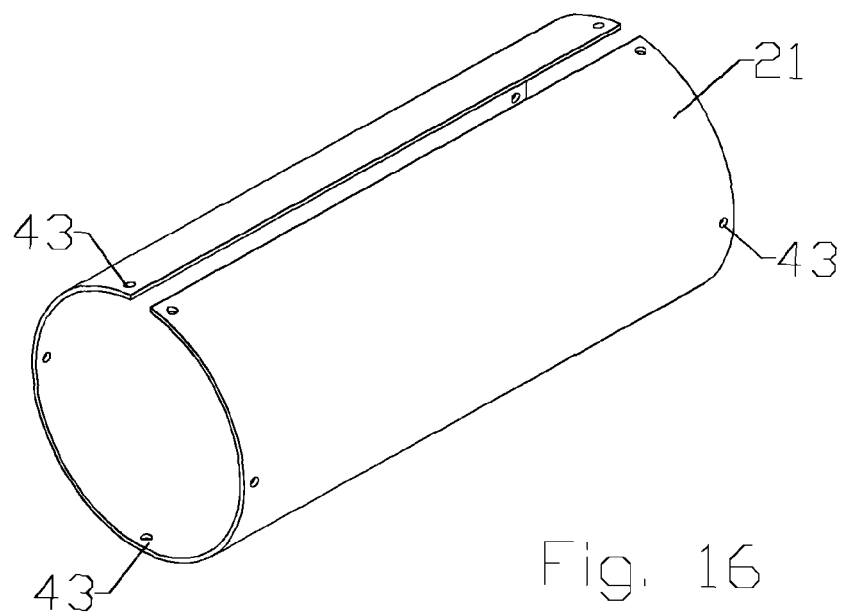

CONDUCTOR SPOOL AND OPTICAL FIBER / ELECTRICAL COMPOSITE CABLE WITH CONDUCTOR SPOOL ASSEMBLY

BACKGROUND

Field of the Invention

This invention relates to a conductor spool for securing excess lengths of a conductor. More particularly, the invention relates to a robust conductor spool with manufacture and installation efficiencies.

Description of Related Art

Fiber to the Antenna (FTTA) installations transmit data to a tower mounted transceiver, known as a Remote Radio Head (RRH) or Remote Radio Unit (RRU). A single composite cable may provide the power, signal and/or control conductors for an FTTA installation.

It is desirable to have high quality terminations for each conductor, to improve signal quality, power efficiency and system reliability. Terminating a conductor in a remote location, such as atop a radio tower, may require an increased skill/training level for the installation personnel and significantly increase the installation time.

Optical conductors may be fragile, requiring great care to properly terminate. Optical conductors may also be especially fragile and prone to damage if a minimum bend radius is not observed. By using a cable storage spool, an optical conductor (such as one or more optical fibers) may be compactly coiled at close to the minimum bend radius, with a significantly reduced chance of damage, as the spool surface sets the minimum bend radius and supports the cable against reduction of the winding diameter (for example if the conductor is subjected to tension from one end or the other).

Prior composite cable RRU/RRH terminations have employed an over-voltage protection and/or distribution box for terminating each of the electrical and optical conductors as individual jumpers. These additional enclosures require field termination of the several conductors atop the radio tower, increasing installation time and labor requirements. Further, each break in the conductors provides another opportunity for signal degradation and/or environmental fouling.

Factory terminated composite cable assemblies are known. However, it may be difficult to provide a single cable assembly for multiple installations as the exact lengths between attachment points may vary installation to installation. Manufacture of custom length composite cable assemblies may be cost prohibitive and prone to measurement error by the purchaser, requiring re-work and/or application of additional jumpers.

Conductor spools adapted for optical fibers are also known. However, these are typically overly complex and expensive to manufacture/install or light weight folded packet configurations suitable only for placement within surrounding enclosures. The folded packet configurations may be inexpensive, but fail to secure each end of the optical fiber from applying tension to the spool, requiring further retention hardware within the surrounding enclosure to prevent damage to the conductor due to over tightening of the coil.

Therefore, an object of the invention is to provide a conductor spool and optical/electrical composite cable assembly with conductor spool that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

FIG. 15 is a schematic isometric view of the frame of an alternative exemplary embodiment of a conductor spool.

FIG. 16 is a schematic isometric view of a cover for the alternative exemplary embodiment of a conductor spool.

DETAILED DESCRIPTION

The inventor has recognized that by utilizing a conductor spool, an entirely sealed wire harness may be provided from the factory with the individual conductors broken out from the composite cable with worst case furcated conductor lead lengths. Thereby, during installation any excess lengths of the individual conductor leads may be simply coiled in the cable storage spool and the prior need for field termination, a termination enclosure and/or jumpers of various lengths between the cable end and the final equipment interconnection may be eliminated.

A single conductor spool assembly may accept multiple conductors on the same or separate spools. For example, where two spools are provided on opposite sides of a supporting frame, a first conductor may be coiled on a first spool provided on one side of the spool in a clockwise direction and a second conductor may be coiled on a second spool on the other side of the frame in the counter-clockwise direction. A conductor, as referenced herein, may be an optical conductor (such as one or more optical fibers), an electrical conductor (such as one or more metallic wires and/or coaxial metal conductors) or a composite conductor comprising multiple optical and/or electrical conductors integrated within a single cable or furcation sub-cable.

Figure 1:
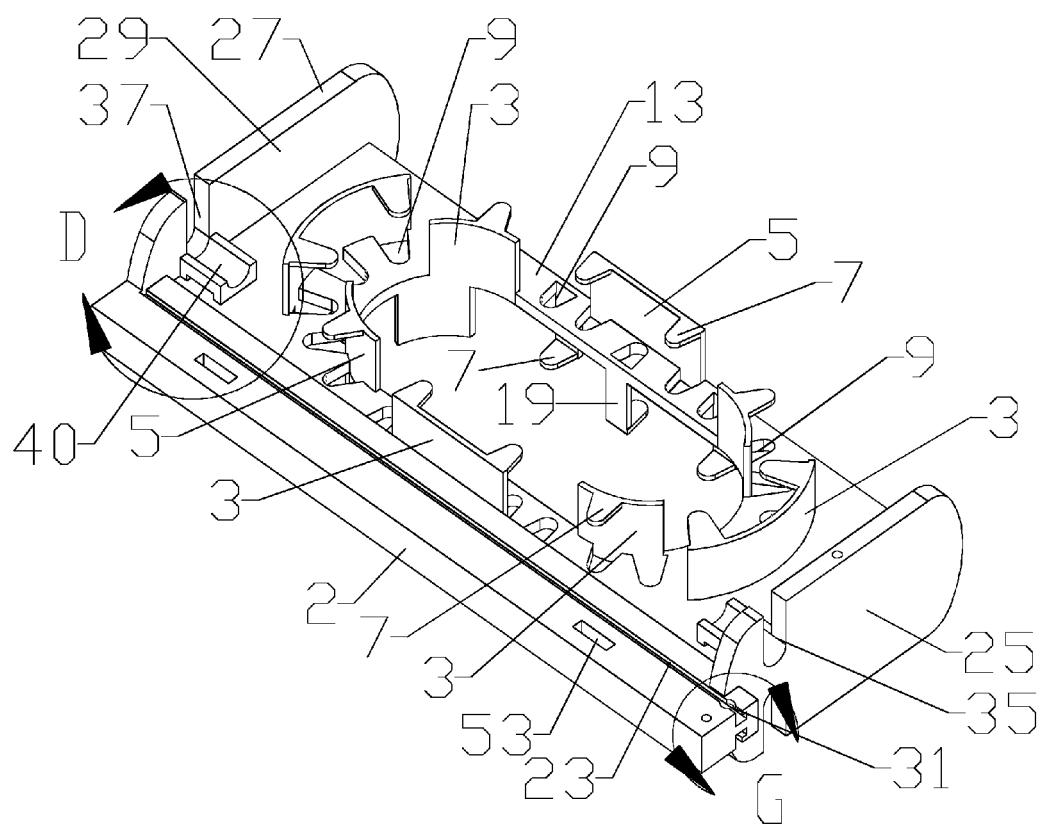
FIG. 1 is a schematic isometric view of the first side of the frame of an exemplary conductor spool.
Figure 2:
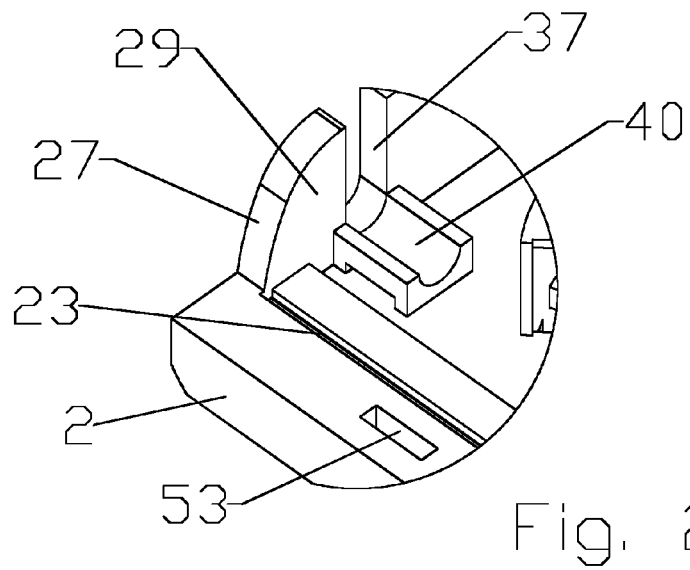
FIG. 2 is close-up view of area D of FIG. 1.
Figure 3:
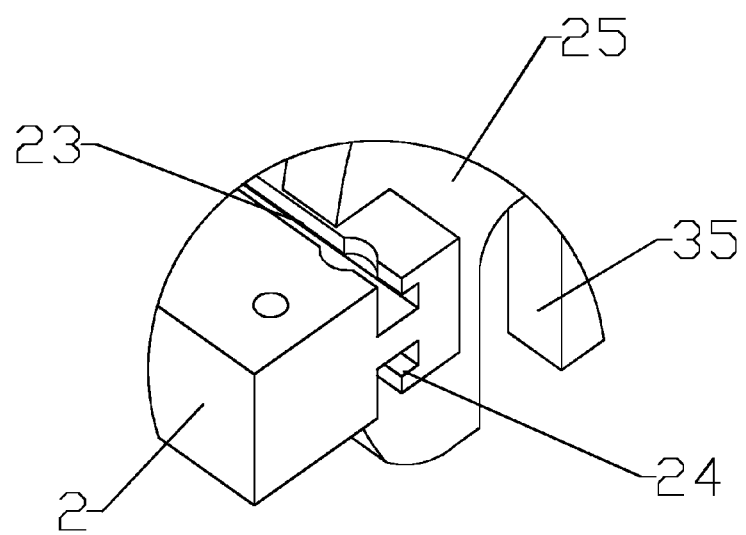
FIG. 3 is a close-up view of area G of FIG. 1.
Figure 8:
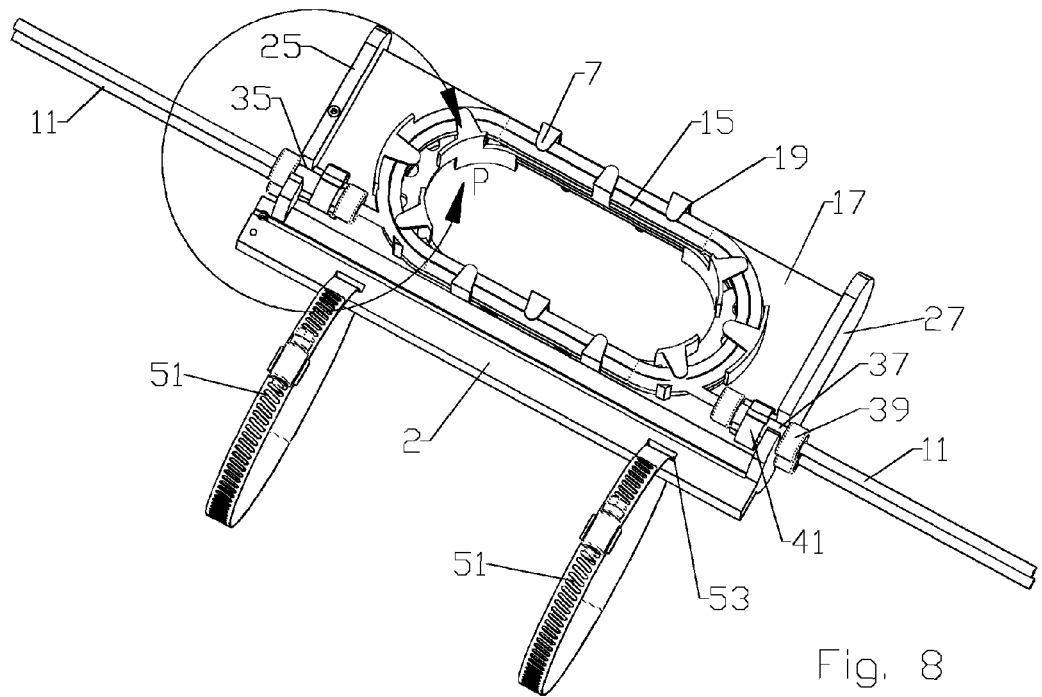
FIG. 8 is a schematic isometric view of the frame of FIG. 1, with a conductor leader seated in each of the first and second spool surfaces.
Figure 9:
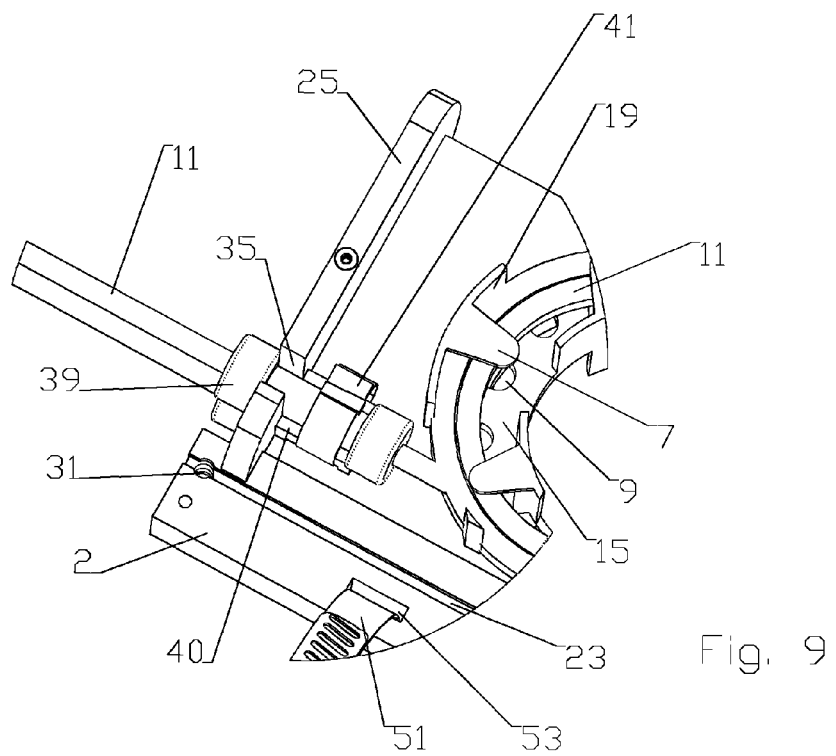
FIG. 9 is a close-up view of area P of FIG. 8.
Figure 10:
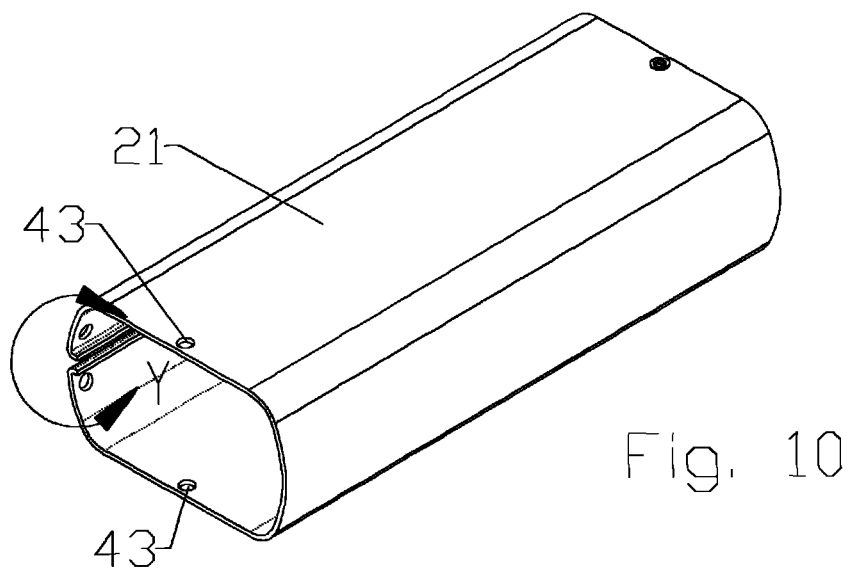
FIG. 10 is a schematic isometric view of a cover for the exemplary conductor spool.
Figure 11:
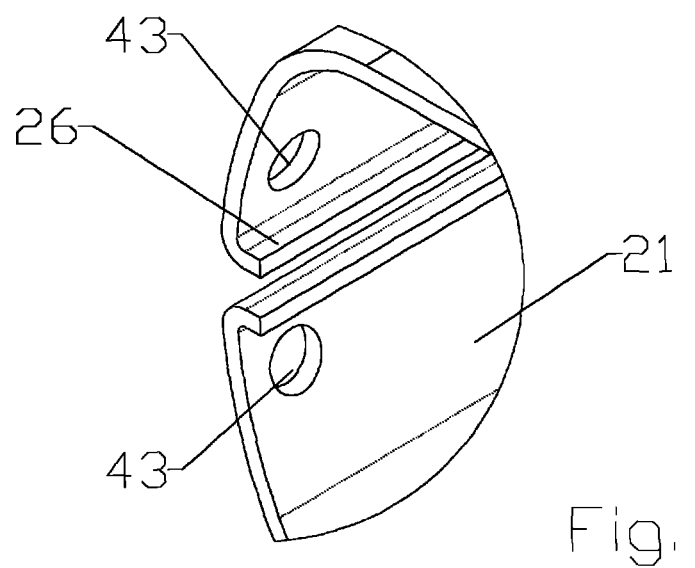
FIG. 11 is a close-up view of area Y of FIG. 10.
Figure 12:
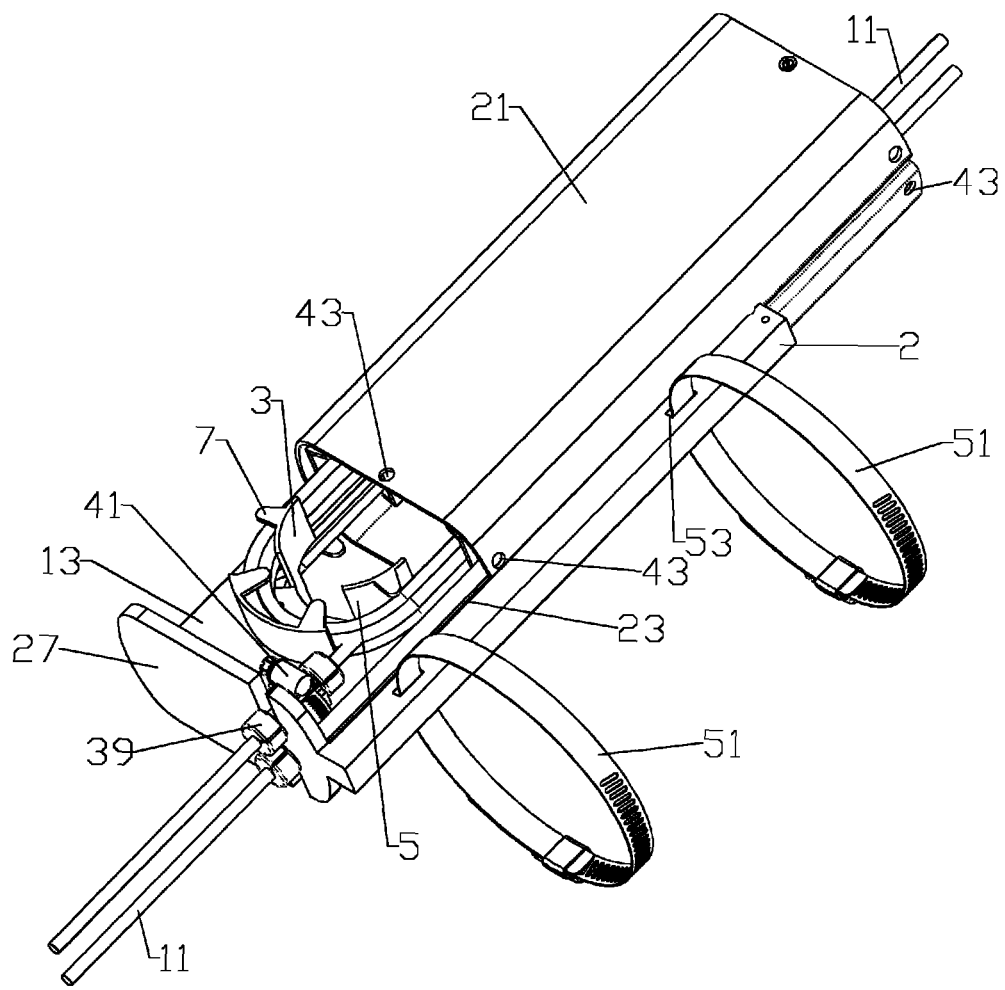
FIG. 12 is a schematic isometric view of the exemplary conductor spool, showing the cover partially advanced along the cover slots.
Figure 13:
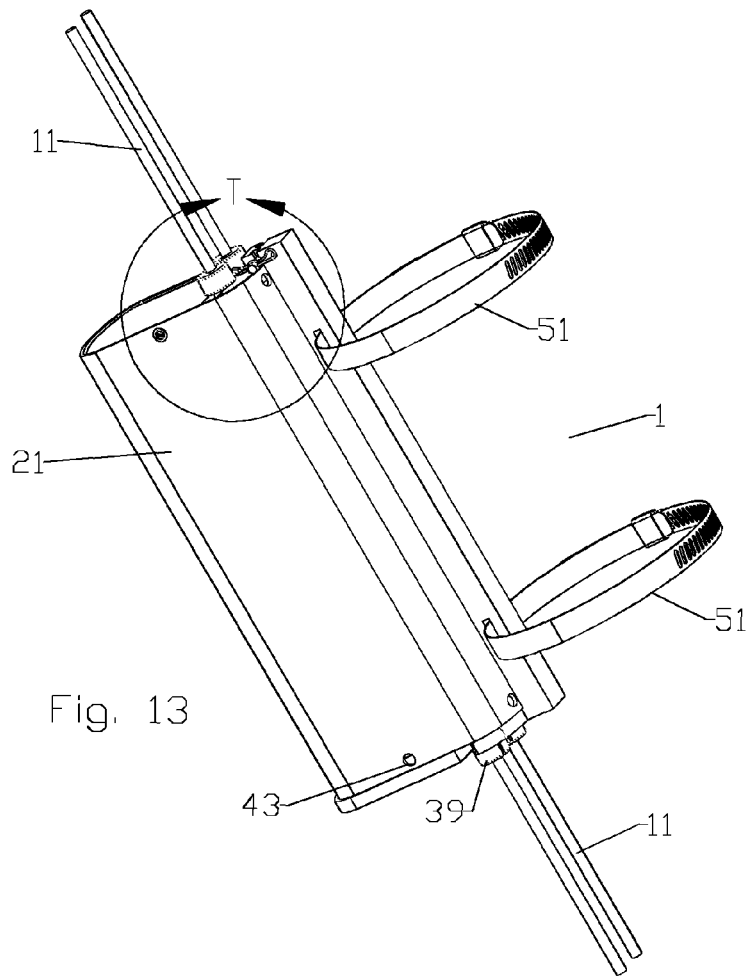
FIG. 13 is a schematic isometric view of the exemplary conductor spool, installed upon a pair of conductor leaders.
Figure 14:
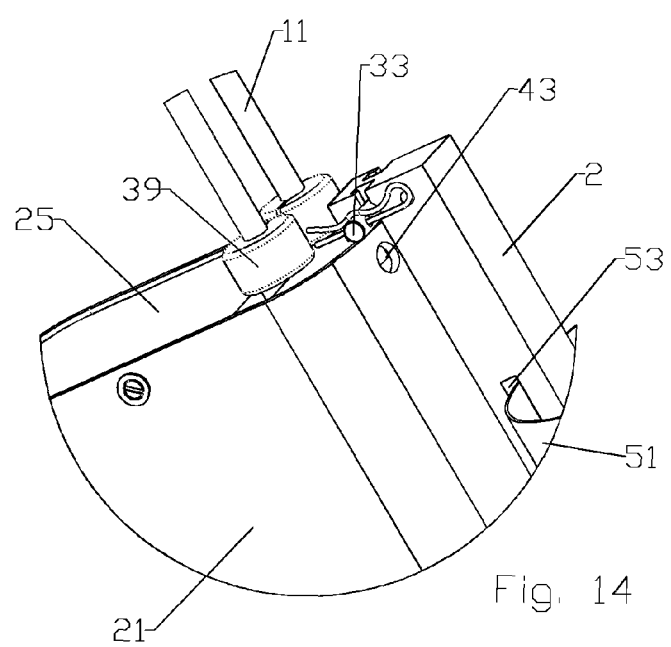
FIG. 14 is a close-up view of area T of FIG. 13.
Figure 17:
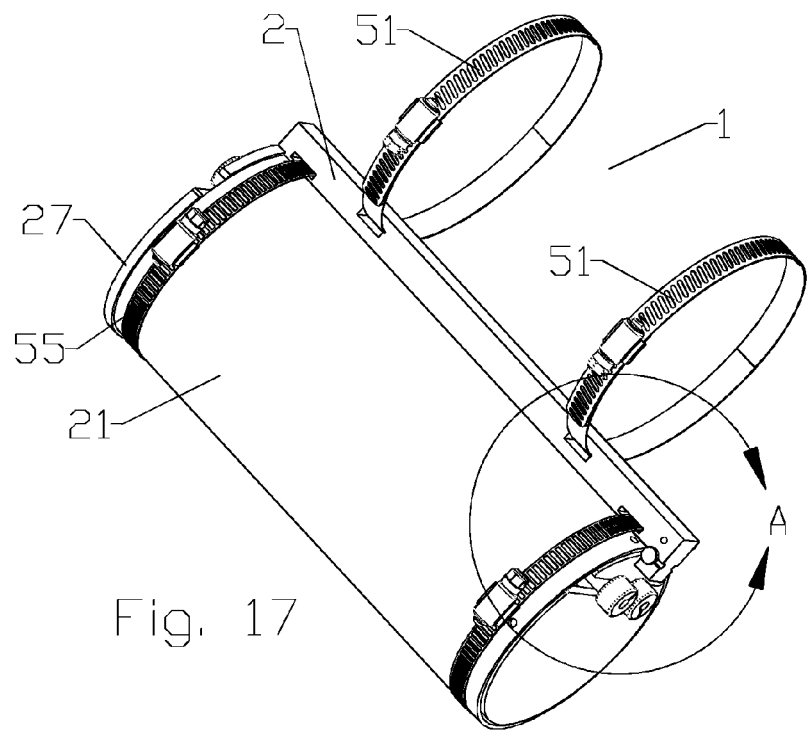
FIG. 17 is a schematic isometric view of an assembled alternative exemplary embodiment of a conductor spool.
Figure 18:
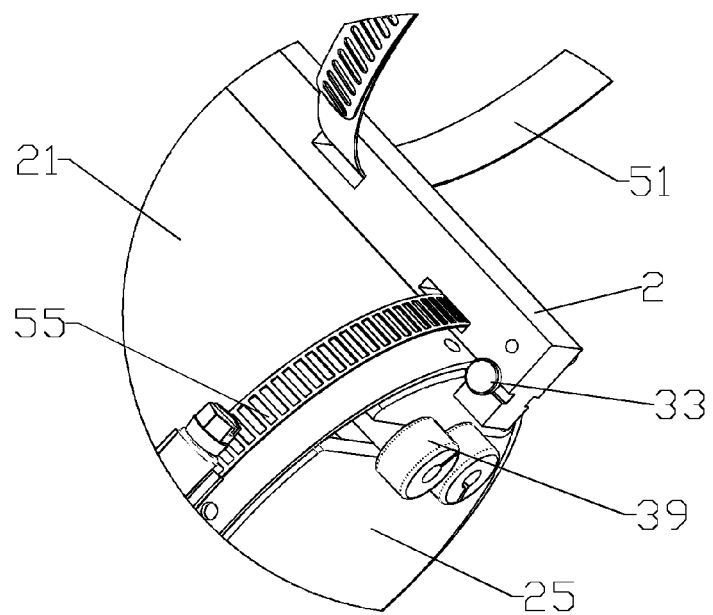
FIG. 18 is a close-up view of area A of FIG. 17.

A first exemplary embodiment is demonstrated in FIGS. 1-14. The conductor spool 1 includes a frame 2, as best shown in FIG. 1, provided with a plurality of first fingers 3, the first fingers 3 and the frame 2 defining a first spool surface 5. The first fingers 3 may be provided along an inner diameter of the first spool surface 5 and also along an outer diameter of the first spool surface 5, defining inner and outer diameters of the first spool surface 5. Hooks 7 may be provided at ends of the first fingers 3, the hooks 7 defining an outer edge of the first spool surface 5. A corresponding mold release aperture 9 may be provided in the frame 2 opposite each hook 7, enabling the frame 2 to be configured without overhanging edges along an extension axis, to enable molding via a simplified two-part mold. The hooks 7 of the first fingers 3 forming the inner and outer diameter of the first spool surface 5 may extend past one another to form an interlocked surface which is simple to thread the conductor lead 11 around, onto the first spool surface 5 (see FIG. 8), but which retains the spooled conductor lead 11 once seated within the first spool surface 5.

Figure 4:
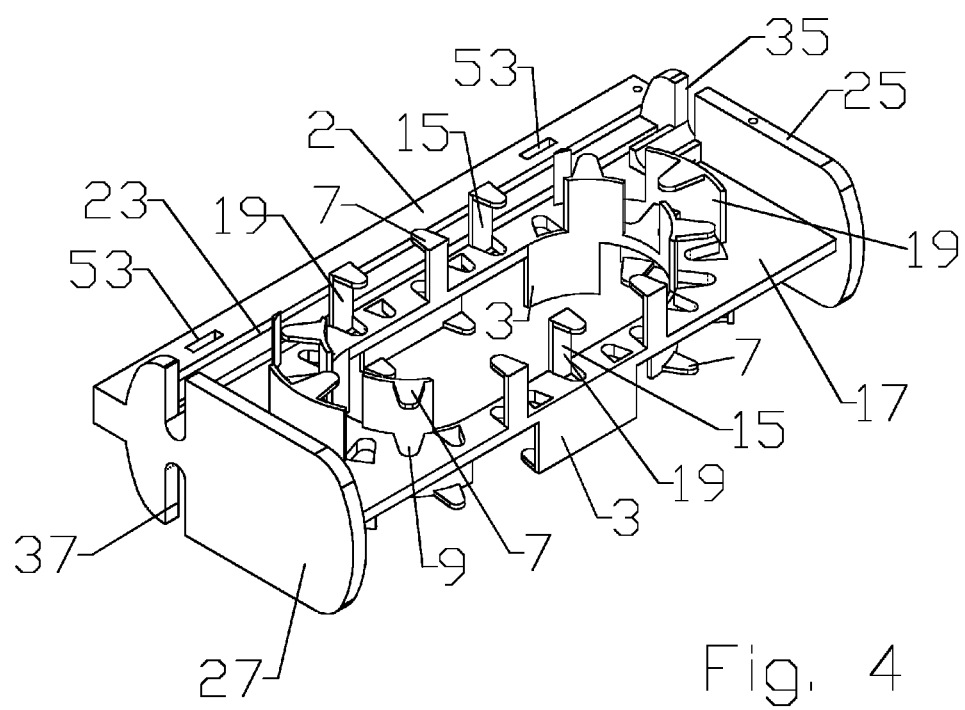
FIG. 4 is a close-up view of the second side of the frame of FIG. 1.
Figure 5:
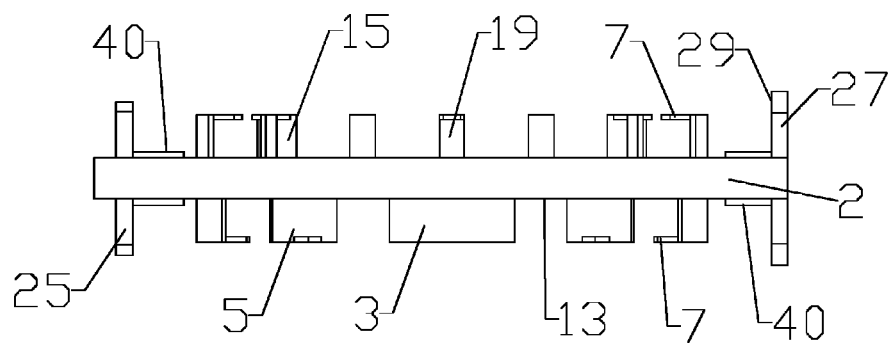
FIG. 5 is a schematic top view of the frame of FIG. 1.

As best demonstrated in FIG. 1 and FIG. 4, the frame 1 may include dual spool surfaces, for example a first spool surface 5 provided on a first side 13 of the frame 2 and a second spool surface 15 on a second side 17 of the frame 2 formed by second fingers 19. The second fingers 19 may be configured and arranged as described with respect to the first fingers 3. Where the first fingers 3 and the second fingers 19 extend from the frame 1 along a common extension axis with respect to the frame 2, at positions spaced apart from one another such that the first fingers 3 and the second fingers 19 (and any corresponding hooks 7 and mold release apertures 9 that are present) do not overlap one another along the extension axis, the complementary spool surfaces on each side of the frame 2 are again formed without overhanging edges maintaining the ability to mold even a two spool surface frame 2 via a simplified two-part mold.

The first spool surface 5 (and second spool surface 15, if present) may be enclosed by a cover 21 seated upon the frame 1. The cover 21 may have a c-shaped configuration with, for example, an ovaloid (FIGS. 10-14) or circular cross-section (FIGS. 15-18). The cover 21 may key to the frame 2, by providing the cover slots 23 with a lip edge 24 in a secondary machining operation (see FIG. 3) that receives a lip end 26 of the cover 21. The cover 21 may be further guided by providing the frame 2 with an entry end 25 and a exit end 27; the entry end 25 is provided with an outer diameter dimensioned to receive the cover 21 thereover and the stop end 27 is dimensioned to provide a stop surface 29 for the cover 21 (see FIG. 5), the stop surface 29 of the exit end 27 inhibiting further travel of the cover 21 within the cover slots 23. A stop aperture 31 (see FIG. 3) may be provided in the frame 2 proximate the entry end 25 of the frame 2. A stop pin 33 inserted into the stop aperture 31 once the cover 21 abuts the stop end 27 inhibits withdrawal of the cover 21 along the cover slots 23, retaining the cover 21 in place upon the frame 2.

Figures 6, 7:
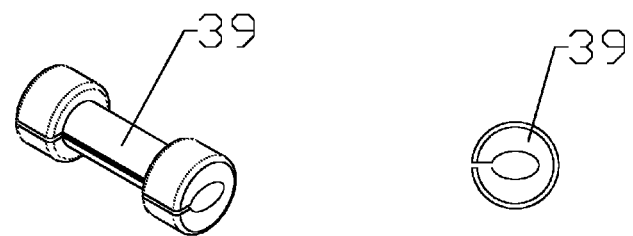
FIG. 6 is a schematic isometric view of a retainer gasket of the exemplary conductor spool.
FIG. 7 is a schematic end view of the retainer gasket of FIG. 6.

The conductor lead 11 with excess length passes through an entry slot 35 of the entry end 25, is coiled along the first or second (if present) spool surface 5, 15 and exits through an exit slot 37 of the exit end 27. To prevent tension along the conductor lead 11 from damaging the coiled conductor lead 11 and/or the fingers 3, 19 defining the spool surface 5, 15, the conductor lead 11 may be retained via a retainer gasket 39 coupled to the frame 2 proximate each of the entry slot 35 and the exit slot 37. As best shown in FIGS. 6 and 7, the retainer gasket 39 may have, for example, a dumbbell profile dimensioned to seat in a boss 40 (see FIG. 2) proximate each of the entry and the exit slots 35, 37, the dumbbell profile retaining the retainer gasket 39 across the respective entry and exit slots 35, 37, the retainer gaskets 39 retained seated against the respective boss 40 proximate the bottom of each of the entry and exit slots 35, 37 by a leader fastener 41. A circumferential grip by the leader fastener 41 upon the retainer gasket 39 evenly grips the conductor lead 11, securing the conductor lead 11 longitudinally, without crimping or crushing the conductor therewithin. Alternatively, the leader cable 11 may be secured with any form of clamping retainer, such as wire or cable ties applied directly to the conductor lead or around the retainer gasket 39.

As the conductor lead 11 has no breaks within the conductor spool 1 it is environmentally protected by its own jacket. Therefore, there may be no particular need to environmentally seal the conductor spool 1. Drain ports 43 may be applied to the cover to enable drainage of any moisture that may enter, the drain ports provided at a plurality of sides and ends, so that the conductor spool 1 can be mounted in whatever orientation an installation may require, without requiring consideration of potential moisture pooling drainage from within the conductor spool 1.

Figure 19:
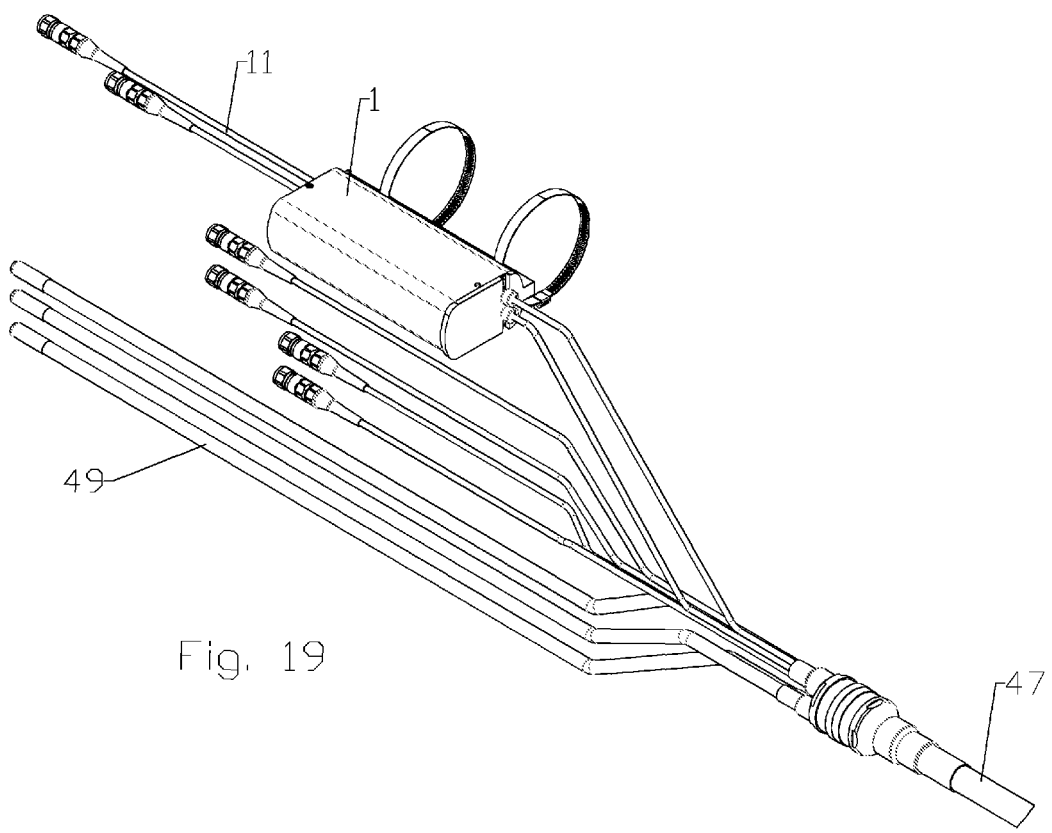
FIG. 19 is a schematic isometric view of a wire harness and conductor spool assembly utilizing the exemplary embodiment of a conductor spool.

The conductor spool 1 may be applied to existing conductor leads of an installation or provided as part of a wire harness and conductor spool assembly 45 for a composite cable 47, for example, including at least an optical conductor and an electrical conductor, a first conductor such as an optical conductor lead 11 and a second conductor such as an electrical conductor lead 49 furcated from the composite cable 47, the conductor spool 1 seated along the optical conductor lead 11, as shown in FIG. 19. Thereby, the assembly may be provided with worst case optical and or electrical conductor lead lengths and any excess length secured within the conductor spool 1 so that, for example, the optical conductor passing through the composite cable 11 and the first optical conductor lead 11 may be terminated at a final connection point without a conductor splice or intermediate interconnection. Alternatively, the conductor spool may be applied to the second conductor, both of the first and second conductors (for example one on the first spool surface 5 and one on the second spool surface 15 or upon the composite cable 47 portion of the wire harness/ assembly.

One skilled in the art will appreciate that the frame 2 configuration enabling manufacture of the frame 2 via precision two-part mold injection molding may provide significant cost efficiencies. Similarly, the simplified structure of the cover 21 may be cost efficiently fabricated via molding, extrusion and/or from sheet metal with a reduced number of cutting and/or bending operations.

In use, the frame 2 of the conductor spool 1 may be secured to a mounting point along the path of the desired conductor leads 11, for example to a radio tower support structure via mounting fasteners 51, such as clamps or straps, passing through interconnection apertures 53 provided in the frame 2. The excess lengths of the conductor leads 11 are spooled within the respective spool surfaces and retaining gaskets 39 are applied around the conductor leads 11 and secured to the frame 2 at the entry and exit ends 25, 27 by leader fasteners 41. The cover 21 is inserted along the cover slots 23 until the cover 21 abuts the stop surface 29. The cover 21 may then be secured in place via a stop pin 33 inserted through the stop aperture 31. If applicable, cover fasteners 55 may be further applied to secure the cover 21 and/or reinforce the cover 21 and frame 3 (see FIGS. 17 and 18), for example where the lip edge 24 keying with the lip end 26 is not provided. Should the installation configuration be changed, the cover 3 may be again removed and a desired length of the conductor lead 11 either further spooled or un-spooled from the conductor spool assembly 1, without ever requiring a break or splice in the conductor lead 11.

One skilled in the art will appreciate that the conductor spool 1 provides a robust yet cost efficient excess conductor accumulation functionality without requiring breaks in the conductor lead, elaborate additional enclosure structures or complex installation tools or procedures.

| Table of Parts | |
|---|---|
| 1 | conductor spool |
| 2 | frame |
| 3 | first finger |
| 5 | first spool surface |
| 7 | hook |
| 9 | mold release aperture |
| 11 | conductor lead |
| 13 | first side |
| 15 | second spool surface |
| 17 | second side |
| 19 | second finger |
| 21 | cover |
| 23 | cover slot |
| 24 | lip edge |
| 25 | entry end |
| 26 | lip end |
| 27 | stop end |
| 29 | stop surface |
| 31 | stop aperture |
| 33 | stop pin |
| 35 | entry slot |
| 37 | exit slot |
| 39 | retainer gasket |
| 40 | boss |
| 41 | leader fastener |
| 43 | drain port |
| 45 | wire harness and conductor spool assembly |
| 47 | composite cable |
| 49 | electrical conductor lead |
| 51 | mounting fastener |
| 53 | interconnection aperture |
| 55 | cover fastener |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A wire harness and conductor spool assembly, comprising:
    a composite cable including a first conductor and a second conductor;
    a first conductor lead and a second conductor lead furcated from the composite cable; and
    a conductor spool seated along the first conductor lead;
    the first conductor passing through the composite cable and the first conductor lead without a conductor splice or intermediate interconnection.

2. The assembly of claim 1, wherein the conductor spool further comprises:
    a frame provided with a plurality of first fingers, the first fingers and the frame defining a first spool surface;
    the frame provided with an entry slot and an exit slot;
    a retainer gasket coupled to the frame proximate each of the entry slot and the exit slot; and
    a cover seated upon the frame, the cover enclosing the first spool surface.

3. The assembly of claim 2, the first spool surface is provided on a first side of the frame and a second spool surface is provided on a second side of the frame;
    the first conductor lead seated within the first spool surface and the second conductor lead seated within the second spool surface.

4. The assembly of claim 2, wherein the cover seats within cover slots provided in the frame;
    the frame provided with an entry end and a stop end; the entry end provided with an outer diameter dimensioned to receive the cover there over and the stop end dimensioned to provide a stop surface for the cover, the stop surface inhibiting further travel of the cover within the cover slots.

5. The assembly of claim 4, wherein the frame has a stop aperture and a stop pin inserted into the stop aperture;
    whereby the stop pin inhibits movement of the cover along the cover slots.

6. The assembly of claim 2, wherein ends of the first fingers are provided with hooks, the hooks defining an outer edge of the first spool surface.

7. The assembly of claim 6, wherein a mold release aperture is provided in the frame opposite each hook.

8. The assembly of claim 2, wherein the first fingers are provided along an inner diameter of the first spool surface and an outer diameter of the first spool surface.

9. The assembly of claim 2, wherein the first spool is provided on a first side of the frame and a second spool surface is provided on a second side of the frame.

10. The assembly of claim 9, wherein the second spool surface is defined by a plurality of second fingers; the first fingers and the second fingers extending from the frame, along a common extension axis with respect to the frame, at positions spaced apart from one another such that the first fingers and the second fingers do not overlap one another along the extension axis.

11. The assembly of claim 2, wherein the cover seats within cover slots provided in the frame.

12. The assembly of claim 2, wherein the retainer gasket has a dumbbell profile dimensioned to seat in a boss proximate each of the entry and the exit slots; each of the retainer gaskets retained against the respective boss by a fastener.

13. The assembly of claim 2, wherein the cover has a c-shape with an ovaloid cross-section.

14. The assembly of claim 2, further including at least one interconnection aperture in the frame, the interconnection aperture dimensioned to receive a mounting fastener for coupling the cable spool to a desired location.

* * * * *